United States Patent [19]
Ogata

[11] Patent Number: 5,975,827
[45] Date of Patent: Nov. 2, 1999

[54] SPARE TIRE MOUNTING STRUCTURE

[75] Inventor: Masahiko Ogata, Kanagawa, Japan

[73] Assignee: Isuzu Motors Limited, Tokyo, Japan

[21] Appl. No.: 08/921,344

[22] Filed: Aug. 29, 1997

[30] Foreign Application Priority Data

Aug. 31, 1996 [JP] Japan ...................................... 8-248705

[51] Int. Cl.⁶ .................................................. B62D 43/04
[52] U.S. Cl. ....................................... 414/463; 224/42.23
[58] Field of Search ..................................... 414/463, 465; 224/42.23; 254/323

[56] References Cited

U.S. PATENT DOCUMENTS

| | | | |
|---|---|---|---|
| 3,175,742 | 3/1965 | Cadmus | 414/463 X |
| 4,915,358 | 4/1990 | Stallings | 414/463 X |

FOREIGN PATENT DOCUMENTS 4-55489  5/1992  Japan .

*Primary Examiner*—Janice L. Krizek
*Attorney, Agent, or Firm*—Sughrue, Mion, Zinn, Macpeak & Seas, PLLC

[57] ABSTRACT

A spare tire bracket 1 composed of a disk-shaped flat plate member is disposed on the upper surface of a spare tire 4 in such a manner that the spare tire bracket 1 is in contact with the spare tire 4, while a hoist device mounting bracket 2 is fixed to the upper surface of the spare tire bracket 1 in such a manner that the hoist device mounting bracket 2 is inclined backwardly. The spare tire bracket 1 is structured such that it is easiest to deform downwardly at the base end portion 16 thereof to which the hoist device mounting bracket 2 is to be fixed and thus, when an external force is given thereto, the spare tire bracket 1 is bent and deformed downwardly at such base end portion 16. This widens a clearance between the hoist device mounting bracket 2 and a canister 29, thereby preventing interference between them.

10 Claims, 5 Drawing Sheets

FIG. 7
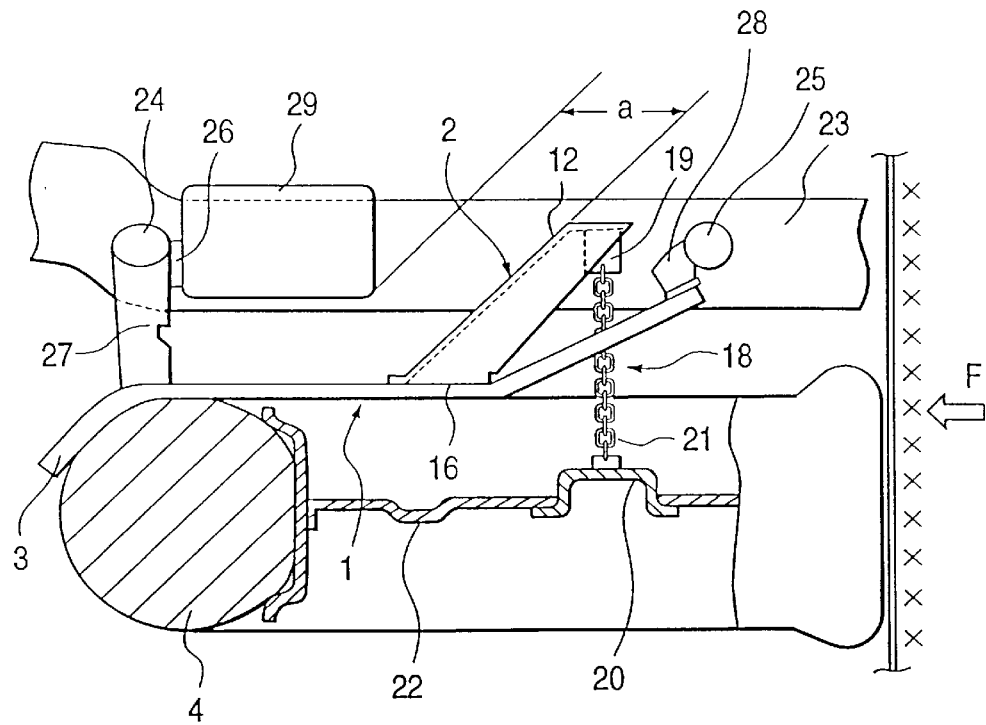
PRIOR ART  FIG. 8
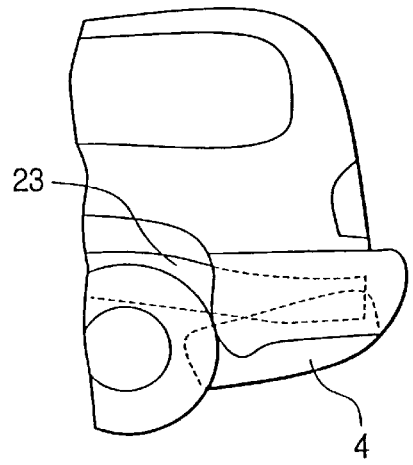

ical field of the invention

SPARE TIRE MOUNTING STRUCTURE

BACKGROUND OF THE INVENTION

1. Field of the Invention

The present invention relates to a spare tire mounting structure for mounting fixedly a spare tire on cross members respectively interposed between a pair of side frames provided under the floor of the body of a vehicle through a hoist device and, in particular, to a spare tire mounting structure which is suitable for prevention of interference between a spare tire, a mounting bracket for mounting the same and the like, and peripheral devices when a collision occurs.

2. Related Art

As shown in FIG. 8, a spare tire 4 is disposed between a pair of side frames 23 under the floor of the rear portion of the body of a vehicle. The rear ends of the side frames and the rear portion of the spare tire 4 are disposed adjacently to the rear end of the vehicle and, therefore, when a collision occurs from behind the vehicle, a great forward shock is given to them. The spare tire 4 is generally held fixedly on the side frames 23 side by a mounting structure shown in FIG. 9. That is, between a pair of side frames 23 and 23, there are fixed a pair of front side and rear side cross members 24a and 25a in such a manner that they are properly spaced from each other in the longitudinal direction of the vehicle. A mounting bracket 30 is fixed to the front side cross member 24a and a canister 29 is fixedly held by the front side cross member 24a. The canister 29 is connected to a fuel tank (not shown) through a pipe or the like (not shown). By the way, the canister 29 is a device which adsorbs and stores a volatile fuel contained within the fuel tank and, generally, the outer plate of the canister 29 is formed of plastic material.

On the other hand, on the rear side cross member 25a, there is provided a hoist device mounting bracket 31 in such a manner that it is inclined forwardly with the base end side thereof fixed to the rear side cross member 25a. A spare tire hoist device 18a is mounted on the hoist device mounting bracket 31. The spare tire hoist device 18a comprises a securing member 20a, a chain 21a having one end side connected to the securing member 20a, a hoist member 19a for hoisting the chain 21a, and the like, while the hoist member 19a is fixed to the hoist device mounting bracket 31.

The spare tire 4 is fixedly held in such a manner that the front side of the outer periphery thereof is in contact with the mounting bracket 30 and the securing member 20a is secured to the disk wheel of the spare tire 4. By the way, as shown in FIG. 9, the spare tire 4 and hoist device mounting bracket 31 are arranged at a proper distance from the canister 29, so that they are prevented from interfering with each other.

On the other hand, conventionally, as a spare tire mounting structure, there are known a large number of structures and an example of such structures is disclosed in Unexamined Japanese Utility Model Publication Hei 4-55489, under the title of the invention "spare tire hoisting structure". The spare tire hoisting structure consists of a relatively simple structure in which a spare tire is fixed to one of a pair of cross members respectively provided between a pair of side frames of a vehicle, with the upper surface of the spare tire in contact with one of the two cross members.

However, in this structure, when a great external force is applied to the spare tire hoisting structure in a collision or the like, there is a possibility that the spare tire 4 can fall away from the cross member.

Also, in most of the other prior arts as well, unlike the present invention which will be described later herein, there is a possibility that a spare tire and the like can interfere with their peripheral devices in a collision.

As shown in FIG. 10, if a great external force F is applied to the conventional spare tire mounting structure having such a structure as shown in FIG. 9 in a collision or the like, then the spare tire 4 and side frames 23 are pushed forwardly and the rear side portion thereof is thereby deformed greatly. Due to such deformation, the spare tire 4 pulls strongly the chain 21a of the spare tire hoist device 18a in the downward direction. Also, due to such deformation, as shown in FIG. 10, the mounting bracket 30 is bent forwardly and the hoist device mounting bracket 31 is also deformed greatly in the forward direction, with the result that the hoist device mounting bracket 31 and spare tire 4 can interfere with the canister 29 to thereby deform the canister 29.

SUMMARY OF THE INVENTION

The present invention aims at eliminating the drawbacks found in the above-mentioned conventional spare tire mounting structures. Accordingly, it is an object of the invention to provide a spare tire mounting structure which, even if an external force is applied to the spare tire in a collision or the like, prevents the spare tire, the mounting bracket for holding the spare tire fixedly, and the like from interfering with their peripheral devices.

In attaining the above object, according to the invention, there is provided a spare tire mounting structure for mounting fixedly a spare tire on cross members respectively interposed between a pair of side frames provided under the floor of the body of a vehicle through a spare tire hoist device, in which the spare tire mounting structure comprises a spare tire bracket and a hoist device mounting bracket, the spare tire bracket is composed of a flat plate member fixedly held between a pair of the above-mentioned cross members respectively arranged on the front side and the rear side, the hoist device mounting bracket is provided on the spare tire bracket in a backwardly inclined manner with the base end portion thereof being fixed to a bracket mounting seat of the spare tire bracket, the hoist device mounting bracket further hangs and supports the spare tire hoist device, the spare tire bracket is formed of a disk-shaped flat plate member which is recessed upwardly as a whole, and the spare tire bracket is further increased in width in the vicinity of the bracket mounting seat. Also, the spare tire bracket includes a plurality of beads respectively formed in a recessed manner and extending from the front end of the spare tire bracket toward the rear end thereof, and, among these beads, the centrally situated bead is so formed as to extend up to the vicinity of the bracket mounting seat. Further, a canister for a fuel tank, which is fixed to the front side one of the above-mentioned pair of cross members, and the hoist device mounting bracket are arranged at a proper distance from each other.

The spare tire bracket is formed of a disk-shaped flat plate member and, when it is given a force to compress itself, it is easy to bend in a recessed manner. Also, since the spare tire bracket is increased in width in the vicinity of the bracket mounting seat to which the base end portion of the hoist device mounting bracket is fixed, it is deformed greatly in a recessed manner at such increased width position. As a result of this, the hoist device mounting bracket is greatly bent and deformed downwardly to thereby move the spare tire downwardly and also the hoist device mounting bracket parts away from peripheral devices such as a canister and the like which are disposed in front of the hoist device mounting bracket. This can surely prevent interference between the brackets and the peripheral devices such as a canister and the like.

BRIEF DESCRIPTION OF THE DRAWINGS

FIG. 7 is a side view of a spare tire mounting structure according to the invention, showing the deformed states of the respective component parts thereof when an external force is given thereto in a collision or the like;

FIG. 8 is a partial side view of the outline of a spare tire mounted in a vehicle according to a conventional spare tire mounting structure;

FIG. 10 is a side view of the conventional spare tire mounting structure, showing the deformed states of the respective component parts thereof when an external force is given thereto in a collision or the like.

DETAILED DESCRIPTION OF THE PREFERRED EMBODIMENTS

Figure 1:
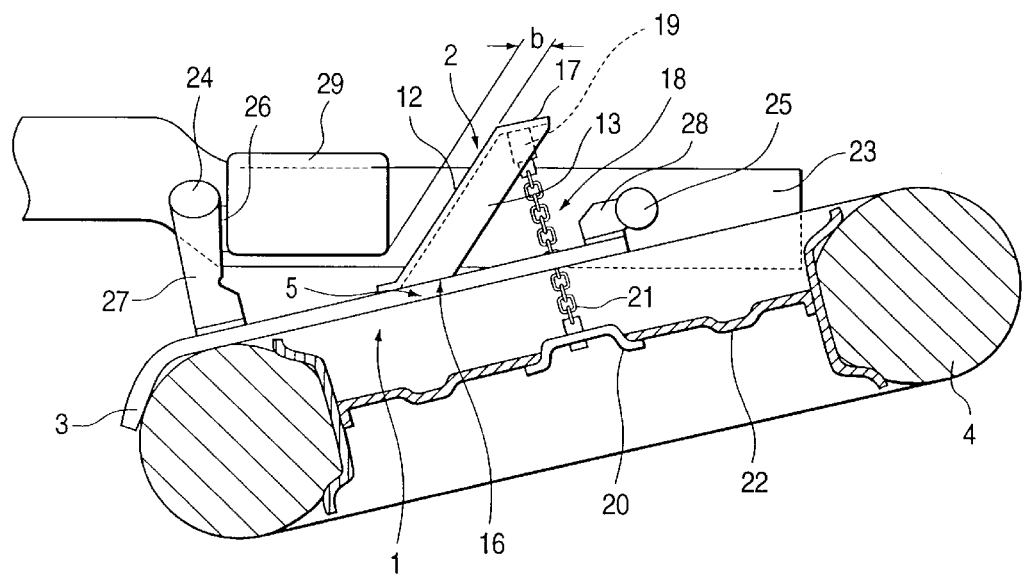
FIG. 1 is a side view of a spare tire mounting structure according to the invention.

Now, description will be given below in detail of an embodiment of a spare tire mounting structure according to the invention with reference to the accompanying drawings. FIG. 1 shows an embodiment of a mounting structure for mounting a spare tire 4 according to the invention, in which the mounting structure is held in its normal state. At first, the present mounting structure comprises a spare tire bracket 1 and a hoist device mounting bracket 2 which is to be fixed to the spare tire bracket 1. Next, description will be given below of the detailed structures of these brackets 1 and 2.

Figure 3:
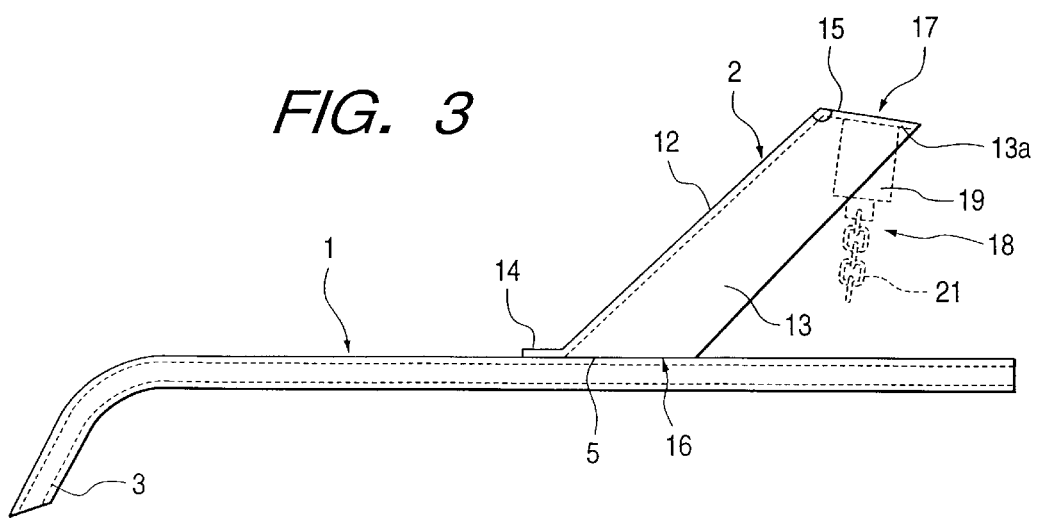
FIG. 3 is a side view taken along the arrow line A shown in FIG. 2, illustrating a spare tire bracket employed in a spare tire mounting structure according to the invention and a hoist device mounting bracket fixed to the spare tire bracket.
Figure 2:
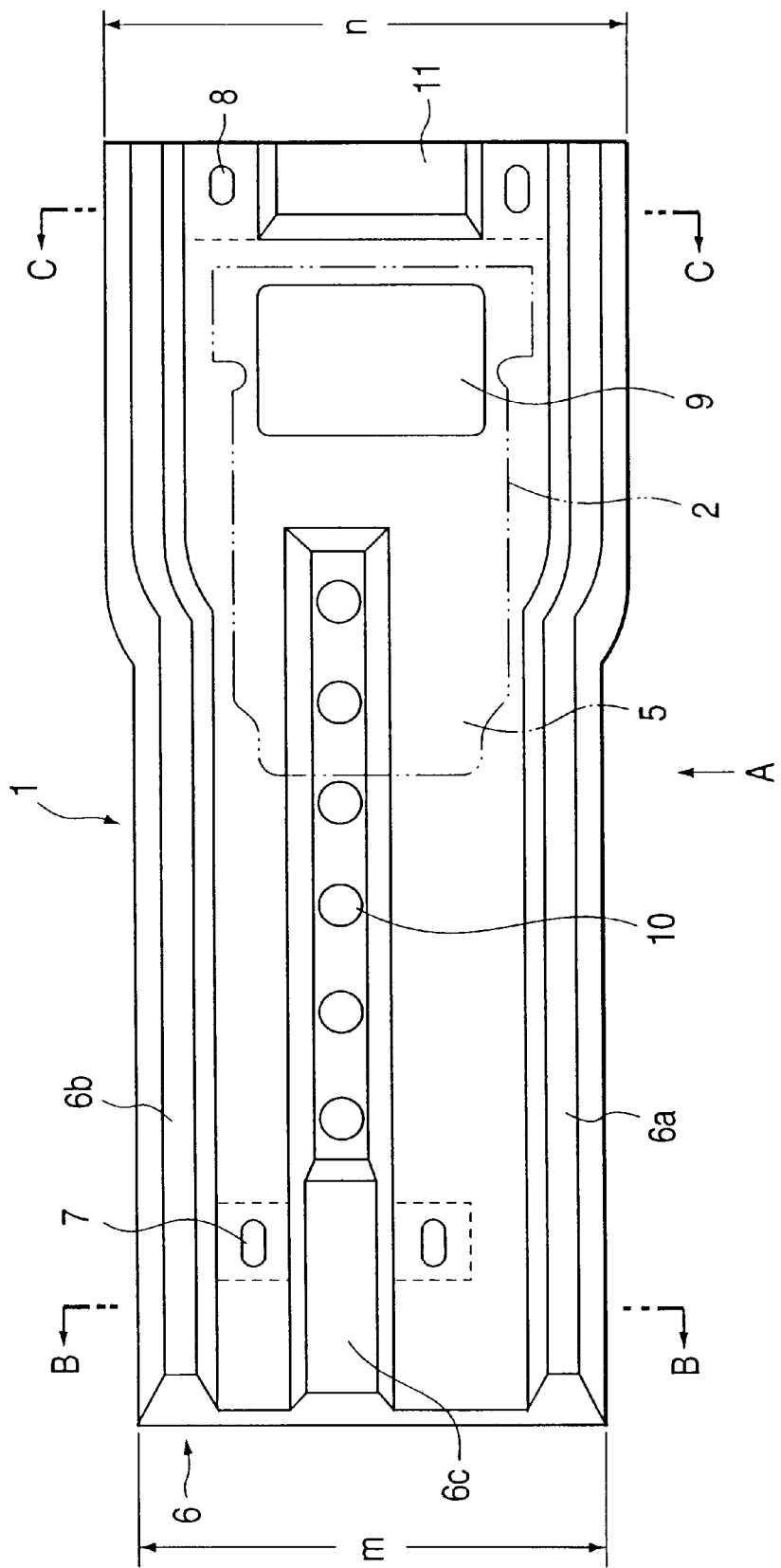
FIG. 2 is a plan view of the structure of a spare tire bracket which is one of the main component parts of a spare tire mounting structure according to the invention.

As shown in FIGS. 2 and 3, the spare tire bracket 1 is composed of a disk-shaped flat plate member which is formed in an upwardly concave or recessed manner and, as shown in FIGS. 1 and 3, the front end portion of the spare tire bracket 1 is inclined downwardly in an arc manner. The arc-shaped inclined portion 3, as shown in FIG. 1, is used to touch and hold the front surface of the outer periphery of the spare tire 4. Also, the spare tire bracket 1, as shown in FIG. 2, is formed in such a manner that it has a uniform width m from the front end thereof to a middle position thereof toward the rear portion thereof and is suddenly increased in width at the middle position to have a uniform width n from there to the rear end thereof. By the way, the position of the spare tire bracket 1 where the width thereof is increased corresponds to the position of a bracket mounting seat 5 to which the base end portion 16 of the hoist device mounting bracket 2 can be fixed.

Figure 4:
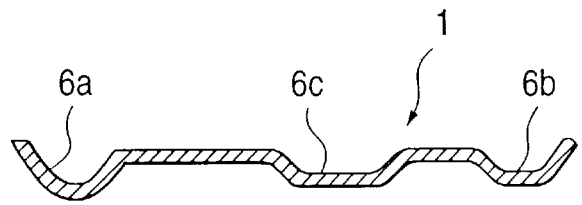
FIG. 4 is a section view taken along the line B—B shown in FIG. 2.
Figure 5:
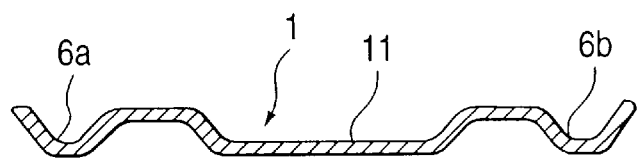
FIG. 5 is a section view taken along the line C—C shown in FIG. 2.

In the spare tire bracket 1, there are recessedly formed a plurality of beads 6 (in FIG. 2, a total of three beads, that is, right, left and central beads). Out of the beads 6, the right and left beads 6a and 6b, as shown FIGS. 2, 4 and 5, are formed in such a manner that they are symmetrical to each other and extend from the front end of the spare tire bracket 1 to the rear end thereof. On the other hand, the centrally situated bead 6c, as shown in FIG. 2, is formed in such a manner that it extends from the front end of the spare tire bracket 1 to the vicinity of the position of the bracket mounting seat 5. By the way, the beads 6 are so formed as to have a uniform width and, especially, the right and left beads 6a and 6b may also be formed such that the bead width thereof is increased at the position where the spare tire bracket 1 is increased in width.

Also, in the spare tire bracket 1, there are formed mounting holes 7, 8 and a through hole 9; in the bead 6c, there are opened up a plurality of holes; and, in the rear end portion of the spare tire bracket 1, there is recessedly formed a bead 11 which has a relatively large width.

Figure 6:
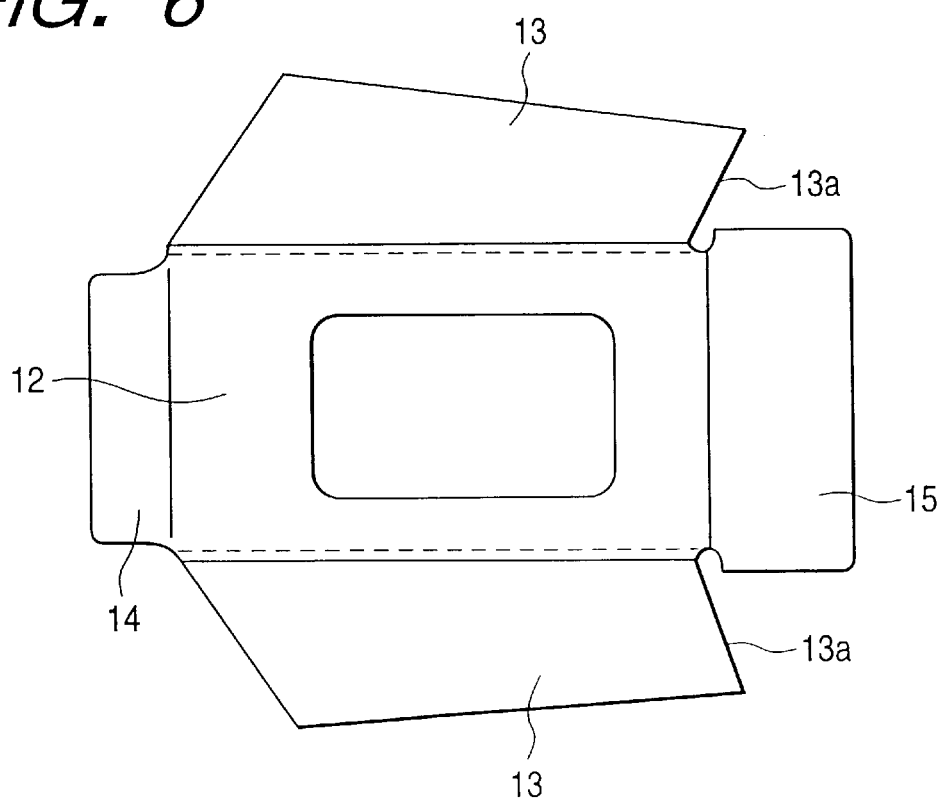
FIG. 6 is a developed view of a hoist device mounting bracket employed in a spare tire mounting structure according to the invention.
Figure 9:
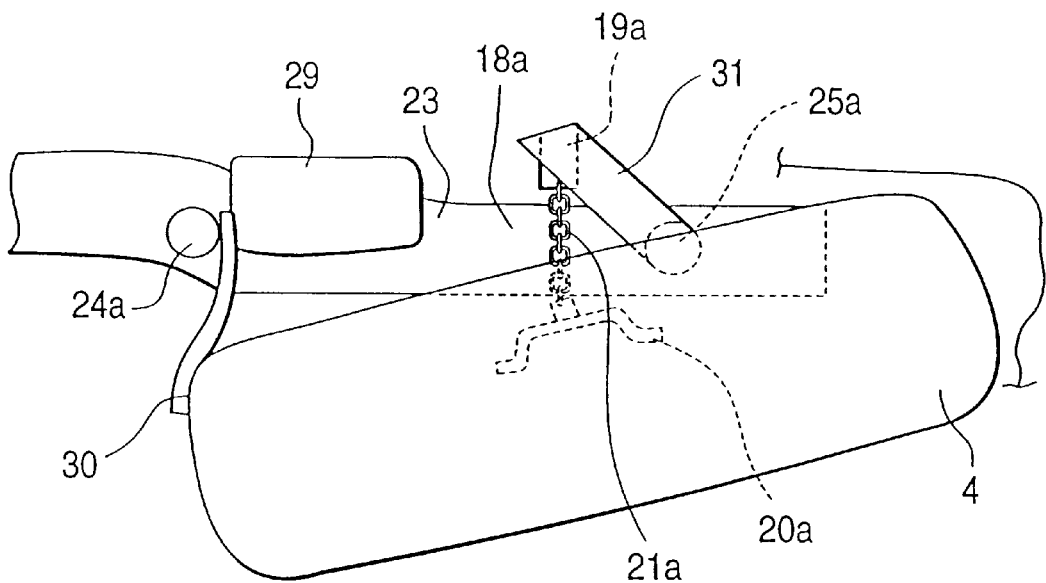
FIG. 9 is a side view of the outline of a conventional spare tire mounting structure.
Figure 10:
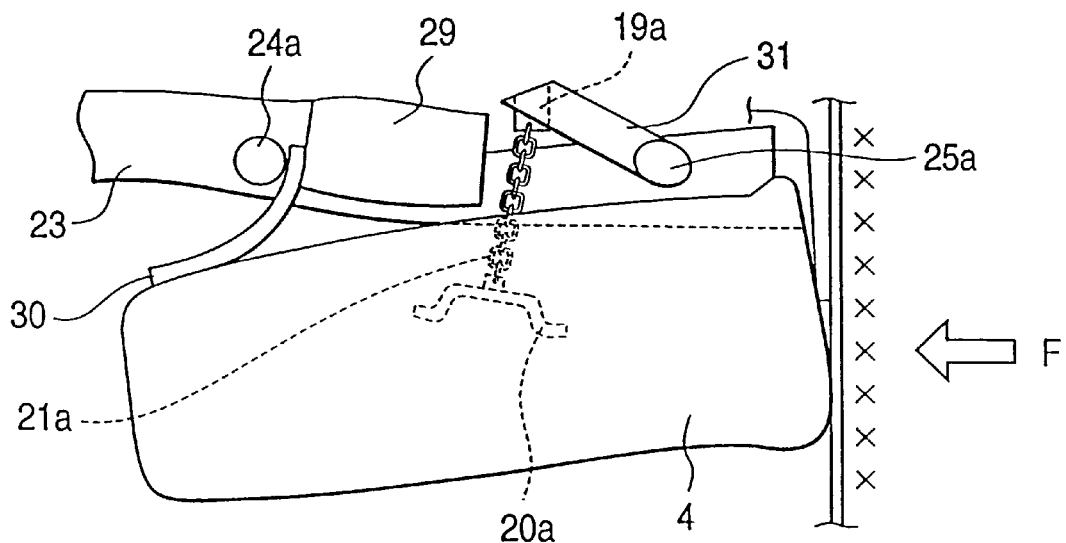

Now, the hoist device mounting bracket 2, as shown in FIGS. 1 and 3, is formed as a columnar body which rises up from the spare tire bracket 1. FIG. 6 shows a developed plan view of the hoist device mounting bracket 2, that is, the hoist device mounting bracket 2 can be produced by bending and welding a sheet of plate having such an outline as shown in FIG. 6. In particular, the hoist device mounting bracket 2 comprises a back surface portion 12, two side walls 13, 13 respectively formed on the two sides of the back surface portion 12, a lower plate 14, an upper plate 15, and the like. By the way, the base end portion 16 of the hoist device mounting bracket 2 is composed of the respective lower ends of the two side walls 13, 13, and the lower plate 14. Also, the respective upper ends 13a, 13a of the two side walls 13, 13 and the upper plate 15 are welded together to thereby form an upper end face 17. That is, as shown in FIG. 3, the hoist device mounting bracket 2 consists of a columnar body structured such that the base end portion 16 is fixedly secured to the bracket mounting seat 5 of the spare tire bracket 1, the back surface portion 12 and the two side walls 13, 13 respectively bent from the back surface portion 12 rise up in a backwardly inclined manner, and the upper end face 17 is formed at the rising ends thereof.

As shown in FIG. 1, a spare tire hoist device 18 comprises a hoisting member 19 to be fixed to the upper end face 17 of the hoist device mounting bracket 2, a securing member 20 to be secured to the disk wheel 22 of the spare tire 4, a chain 21 to be interposed between the hoisting member 19 and securing member 20, and the like. The spare tire hoist device 18 is structured in such a manner that, if a hoisting crank rod is secured to the securing portion (not shown) of the hoisting member 19 and is then rotated, then the chain 21 can be hoisted. By the way, the chain 21 is disposed through the through hole 9 formed in the spare tire bracket 1.

Backwardly under the floor of the body of the vehicle, as shown in FIG. 1, there is arranged a side frame 23. The side frame 23 consists of a pair of side frames 23 which are respectively arranged on the right and left sides of the vehicle body and also are identical in shape with each other, while there are provided a plurality of cross members between the right and left side frames 23 and 23. In the portion where the spare tire 4 is arranged, as shown in FIG. 1, the front side cross member 24 and rear side cross member 25 are interposed and fixed between the right and left side frames 23 and 23, while the front side cross member 24 and rear side cross member 25 are arranged at a proper distance from each other.

As shown in FIG. 1, the base end of a front side support bracket 27 is fixed to the front side cross member 24 and the base end of a rear side support bracket 28 is fixed to the rear side cross member 25, while the spare tire bracket 1 shown in FIG. 2 is fixed to the respective leading end portions of the front side and rear side support brackets 27 and 28 through the mounting holes 7 and 8 respectively formed in the spare tire bracket 1. Also, a canister 29 having a proper capacity is fixedly held by the front side support bracket 27 through a bracket 26 and is also supported on the front side cross member 24 side.

As shown in FIG. 1, in such a manner that the upper surface of the spare tire 4 is covered with the spare tire bracket 1 and one end of the outer periphery of the spare tire 4 is in contact with the inclined portion 3 of the spare tire bracket 1, the spare tire 4, in particular, the side portion thereof is contacted with the spare tire bracket 1. In this state, if the securing member 20 of the spare tire hoist device 18 is secured to the disk wheel 22 of the spare tire 4 and the chain 21 is put on the securing member 20, then the spare tire 4 can be supported by the front side cross member 24 and rear side cross member 25 through the spare tire bracket 1 as well as through the front side and rear side cross members 27 and 28. Also, in this state, as shown in FIG. 1, between the canister 29 and hoist device mounting bracket 2, there is formed a proper clearance b which can keep them from interfering with each other.

Next, description will be given below of the deformed states of the respective parts of the spare tire mounting structure of the invention when an external force is applied thereto in a collision or the like, with reference to FIG. 7. Generally, if a disk-shaped flat plate member is given a compression force from the longitudinal direction thereof, then the compression force acts heavily on the flange of the peripheral edge of the flat plate member, thereby deforming the flange in such a manner that the flange is expanded outwardly. As a result of this, the whole flat plate member is deformed downwardly (that is, toward the bottom of the plate). As described before, the spare tire bracket 1 according to the invention is composed of a disk-shaped flat plate member and, in particular, is increased in width in the middle portion thereof, so that the present spare tire bracket 1 is deformed downwardly to a great extent especially at the position thereof where the width thereof starts to increase. And, as described before, since the increased width position thereof corresponds to a position existing in the rear of the fixed position of the base end portion 16 of the hoist device mounting bracket 2, the spare tire bracket 1 is greatly deformed downwardly in the rear of the hoist device mounting bracket 2. That is, as shown in FIG. 7, if an external force F is given from behind, then the side frames 23 and spare tire 4 are pushed forwardly and are thereby deformed. Due to such deformation, the spare tire bracket 1 arranged and fixed between the front side and rear side cross members 24 and 25 is given a compression force and is thereby deformed greatly in the downward direction at the position existing in the rear of the base end portion 16 of the hoist device mounting bracket 2. At the same time, since the spare tire 4 is deformed due to the external force F and is thereby pushed downwardly, the chain 21 of the spare tire hoist device 18 is pulled to thereby deform the hoist device mounting bracket 2 downwardly in such a manner that it falls down, which in turn accelerates the deformation of the spare tire bracket 1. Also, as described before, because the central bead 6c of the spare tire bracket 1 is so formed as to extend only up to the vicinity of the position of the base end portion 16 of the hoist device mounting bracket 2, the portion of the spare tire bracket 1 that is situated adjacent to the base end portion 16 is especially low in rigidity, so that the above-mentioned downward deformation can be developed more easily in such portion.

On the other hand, as shown in FIGS. 1 and 7, the deformation of the front and rear side support brackets 27 and 28 is smaller than that of the spare tire bracket 1 and hoist device mounting bracket 2, while the change of the position of the canister 29 is smaller than that of the spare tire bracket 1 and the like. Due to this, as shown in FIG. 7, there is produced a clearance having a dimension a between the canister 29 and the back surface portion 12 of the hoist device mounting bracket 2, while the dimension a is larger than the clearance b produced between them in the normal state thereof shown in FIG. 1. In the present embodiment, the part that is disposed nearest to the canister 29 is the hoist device mounting bracket 2 and, as described above, the hoist device mounting bracket 2 is shifted in the opposite direction to the canister 29, so that the canister 29 is prevented from being interfered by any other part. That is, the canister 29 can be prevented against deformation even in a collision.

In the foregoing description, as the shape of the spare tire bracket 1, there is employed a shape which is shown in FIG. 2. However, the shape of the portion of the space tire bracket 1 where the width is increased may not be connected by such a curved line as shown in FIG. 2. Also, the dimensions, shapes and number of the beads 6a, 6b and 6c are not limited to those shown in the drawings. Further, in the present embodiment, description has been given of a case in which the spare tire 4 is disposed in the rear portion of the vehicle. However, this is not limitative but the present invention can also apply to a case in which a spare tire is disposed under the floor of the front portion of the body of a vehicle. Moreover, in the present embodiment, as a structure for connecting the spare tire bracket 1 to the front side and rear side cross members 24 and 25, there are employed the front side and rear side support brackets 27 and 28 which are both shown in the drawings. However, the invention is not limited to this but other types of brackets can be employed properly according to the position relationship between the spare tire bracket 1 and the front side and rear side cross members 24 and 25. In addition, in the present embodiment, as a part to be prevented against interference, there is selected the canister 29. However, according to the invention, of course, a part to be prevented against interference is not limited to the canister 29.

1) In a spare tire mounting structure according to the present invention, due to employment of a structure in which a spare tire bracket is formed in a shape easy to deform due to an external force applied thereto and a hoist device mounting bracket is disposed at the position of the spare tire bracket that is easiest to deform, when an external force is applied, the spare tire bracket, hoist device mounting bracket and the like are greatly moved downward to thereby widen a clearance between themselves and their peripheral devices such as a canister which is one of the parts to be prevented against interference. As a result of this, the peripheral devices such as a canister and the like can be prevented against deformation. Also, since the present invention employs a relatively simple structure in which an increased width portion is formed in the middle of the spare tire bracket and the hoist device mounting bracket is fixed to the spare tire bracket at such increased width position thereof, the present invention can be enforced easily and at a low cost and can also apply to vehicles which have been already developed into the market.

2) In a spare tire mounting structure according to the present invention, since the centrally situated one of beads, which are so formed in a spare tire bracket as to extend along the longitudinal direction thereof, extends only up to the vicinity of the increased width position of the spare tire bracket, the bending strength of the spare tire bracket at the increased width position is especially lowered so that the spare tire bracket is easy to deform at the increased width position thereof.

3) In a spare tire mounting structure according to the present invention, a canister, which is one of the parts to be prevented against interference, and a hoist device mounting bracket, which is situated at the nearest position to the canister among the component parts of the invention, are previously arranged at a proper distance from each other when they are held in their normal states, whereas, when they are deformed, they are respectively moved in a direction to increase the distance. This makes it possible to positively prevent the canister from being interfered.

What is claimed is:

1. A spare tire mounting structure for fixedly mounting a spare tire to a vehicle, comprising:
    a first support member secured to an underside of the vehicle;
    a second support member secured to the underside of the vehicle and spaced apart from said first support member;
    a spare tire bracket having a first end secured to said first support member, a second end secured to said second support member, and a bracket mounting seat intermediate to said first and second ends;
    a hoist device mounting bracket having a base end portion and an upper end portion, said base end portion fixedly secured to said spare tire bracket at said bracket mounting seat, said hoist device mounting bracket inclined with respect to said spare tire bracket in a direction towards said second end so that said upper end portion of said hoist device mounting bracket extends over said spare tire bracket away from said base end portion and towards said second end; and
    a spare tire hoist device supported by said upper end portion of said hoist device mounting bracket.

2. The spare tire mounting structure as set forth in claim 1, wherein said spare tire bracket includes a plurality of beads respectively formed therein in a recessed manner and extending from said first end of said spare tire bracket toward said second end thereof, and, among said beads, a centrally situated bead is formed so as to terminate near said bracket mounting seat.

3. The spare tire mounting structure as set forth in claim 2, wherein said centrally situated bead and said hoist device mounting bracket operate to concentrate a lateral force, acting on said spare tire bracket in a direction from said second end to said first end, near said bracket mounting seat so that a deformation of said spare tire mounting structure upon receiving said lateral force will be greatest near said bracket mounting seat.

4. The spare tire mounting structure as set forth in claim 1, wherein said spare tire bracket is formed from a flat plate member.

5. The spare tire mounting structure as set forth in claim 1, wherein said spare tire bracket is mounted to the underside of the vehicle so as to be inclined upwardly from said first end of said spare tire bracket to said second end of said spare tire bracket.

6. The spare tire mounting structure as set forth in claim 1, wherein a centerline connecting said first and second ends of said spare tire bracket defines a longitudinal direction of said spare tire bracket, and wherein a width of said spare tire bracket measured in a direction transverse to the longitudinal direction of said spare tire bracket increases at an intermediate section of said spare tire bracket between said first and second ends in the vicinity of said bracket mounting seat.

7. The spare tire mounting structure as set forth in claim 1, wherein said spare tire bracket further comprises a through hole between said bracket mounting seat and said second end, and
    wherein said spare tire hoist device further comprises a flexible linkage passing through said through hole and having a securing member at one end for engaging a wheel of a spare tire.

8. The spare tire mounting structure as set forth in claim 1, wherein, when mounted to the vehicle, said second end of said spare tire bracket is closer to a rear end of the vehicle than said first end.

9. The spare tire mounting structure as set forth in claim 1, further comprising: a first side frame secured to the underside of the vehicle, and
    a second side frame secured to the underside of the vehicle and spaced apart from said first side frame, and wherein said first support member is a first cross member secured to said first and second side frames, and said second support member is a second cross member secured to said first and second side frames.

10. The spare tire mounting structure as set forth in claim 9, wherein a canister for a fuel tank to be fixed to said first cross member and said hoist device mounting bracket are arranged spaced apart at a proper distance from each other.

* * * * *